May 22, 1934.  A. J. BAILIE  1,959,893
RAKE
Filed March 11, 1933
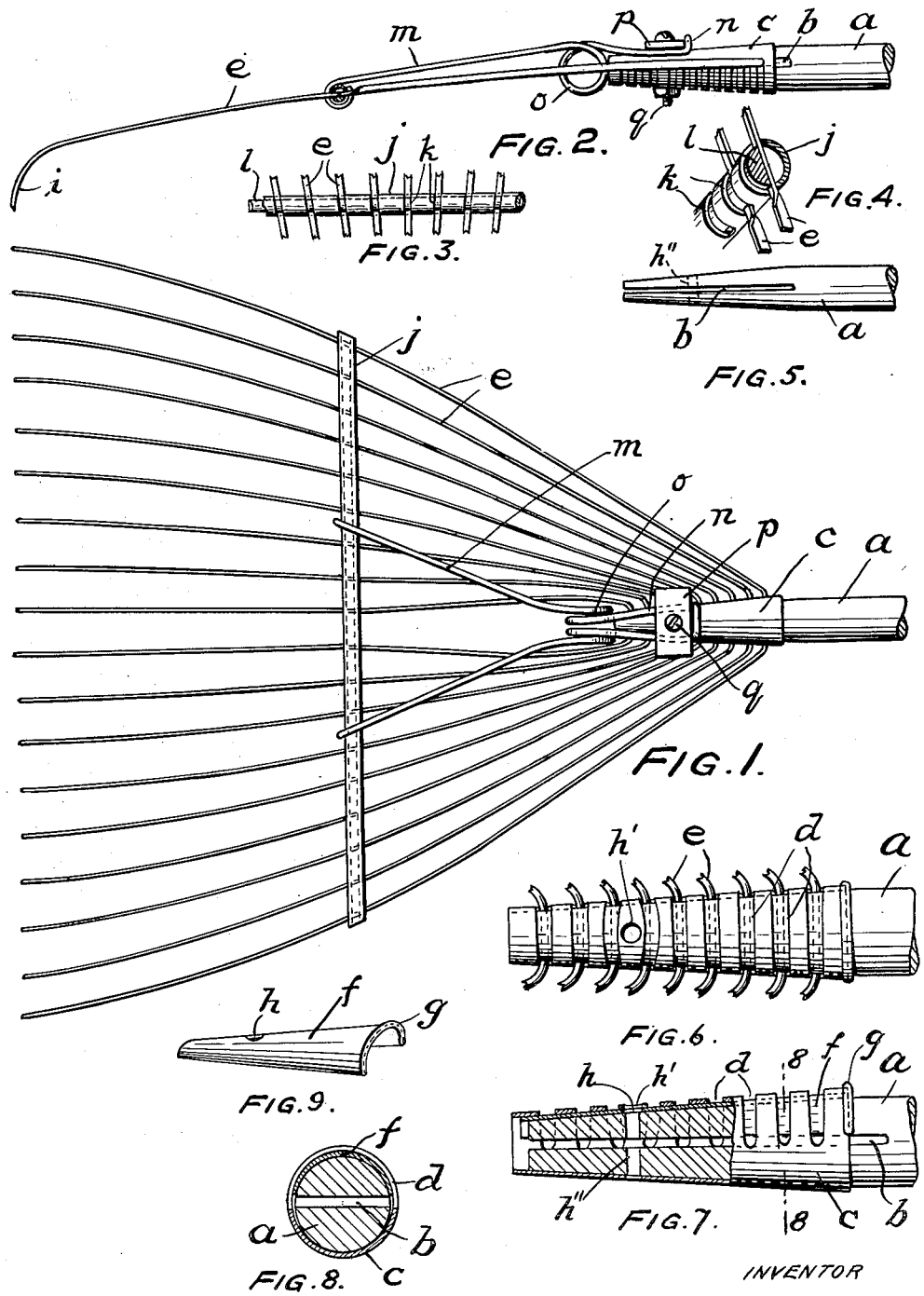
INVENTOR
Alfred J. Bailie
BY
ATTORNEYS.
WITNESS:

Patented May 22, 1934

1,959,893

UNITED STATES PATENT OFFICE 1,959,893

RAKE

Alfred J. Bailie, Wyndmoor, Pa.

Application March 11, 1933, Serial No. 660,395

11 Claims. (Cl. 55—10)

This invention relates to an improvement in rakes. The invention more particularly relates to a rake adapted for use on lawns, as for raking after mowing, raking leaves, etc.

The rake in accordance with this invention will be found to be especially advantageous due to its efficiency in use and durability and at the same time will be readily and inexpensively manufactured.

Generally speaking the rake in accordance with this invention will be characterized by the provision of a ferrule of novel construction enabling ready and efficient assembly with the handle and teeth, of stiffening means for the teeth and of teeth of a novel and efficient form adapting them for cooperation with the ferrule and stiffening means.

Having now generally indicated the nature and purpose of this invention I will proceed to a more detailed description of a preferred embodiment thereof with reference to the accompanying drawing in which:

Fig. 1 is a plan view of a rake embodying this invention;

Fig. 2 is a side view of a modification of the rake shown in Fig. 1;

Fig. 3 is a detail view showing a detail of construction;

Fig. 4 is a perspective view of the detail shown in Fig. 3;

Fig. 5 is a side view of the end portion of a handle;

Fig. 6 is a bottom plan view of a ferrule assembled with teeth and a handle broken away;

Fig. 7 is a side view of the subject of Fig. 6;

Fig. 8 is a sectional view on line 8—8 of Fig. 7;

Fig. 9 is a perspective view of a key adapted for assembling with the ferrule.

In the several figures $a$ indicates a handle which may be of the usual type and of any usual material, as wood. The handle $a$ is tapered at one end and the tapered end provided with a slot $b$.

C indicates a ferrule formed to receive the tapered end of the handle $a$ and provided with a series of circumferential slots $d$, $d$ extending through about half its circumference. The slots $d$ $d$ are adapted to receive the teeth $e$ $e$, which pass through the slot $b$ in handle $a$ when the handle is assembled with the ferrule. $f$ indicates a key or sleeve, semi-circular in cross section and conforming to the taper of the ferrule. The key $f$ is adapted for insertion into the ferrule between the handle $a$ and the ferrule to close the slots $d$ $d$. The key is provided at its longer end with a bead $g$, to facilitate its entry into and removal from the ferrule, and with a hole $h$ adapted when it is in place to align with a hole $h'$ in the ferrule and a hole $h''$, in the handle $a$, which is adapted to align with the hole $h'$ in the ferrule when the handle is in place.

The teeth $e$ $e$ are desirably, though not necessarily formed from lengths of flat material, as any suitable metal having suitable resiliency and resistance to wear. The teeth may, for example, be formed of iron, steel or any suitable alloy, and may be of any desired size. The teeth will desirably be assembled edgewise with the ferrule and handle and will be twisted half around, as shown in Fig. 4, at points in alignment spaced from the ferrule, to extend flatwise. The teeth may and desirably will be somewhat hooked at their ends as indicated at $i$ Fig. 2.

$j$ indicates a spacer for the teeth comprising a tube provided with circumferential slots $k$ $k$ for reception of the teeth and a half round key $l$ adapted to be extended within the tube to close the slots $k$ $k$ above the teeth. The spacer $j$ receives the teeth in their flatwise extension desirably just beyond the points where they are turned from edgewise extension.

$m$ indicates a spring forming stiffening means for the teeth. The spring $m$ is formed from a length of relatively heavy spring wire bent upon itself to form a loop $n$, coiled as at $o$, and having its end portions extending divergently from the coils $o$ to engagement with the spacer $j$.

The locked end of spring $m$ is clamped to the top of the ferrule $c$ through the medium of a clamping plate $p$ and a bolt $q$ which passes through the plate and through the holes $h$, $h'$ and $h''$ in the key, ferrule and handle.

As will now be observed the teeth $e$, $e$ of the rake are formed by flat strips extending edgewise through slots in the ferrule in which they are retained by the slotted end portion of handle $a$, the whole being secured by bolt $q$ and key $f$. Two teeth are formed by each strip and the teeth or strips are twisted or half turned to extend flatwise at aligned points. The teeth or strips are spaced by means of the spacer $j$ through which the strips extend flatwise and in which they are retained by the key $l$. The teeth are stiffened as a whole by means of the spring $m$ secured to the ferrule and to the spacer.

In operation of the rake the teeth are firmly held by the ferrule and flex relatively readily in their flatwise extension from their free ends to their points of twist at about which the spacer is located. The teeth in their edgewise extension from their points of twist to and through the ferrule are relatively inflexible and are stiffened as a whole by the spring $m$. Hence the teeth are prevented from working relatively to the handle except at their end portions.

It will be understood that the above description of a preferred embodiment of this invention shall not be taken as limiting since various modifications may be made in details without departing from the scope of this invention.

What I claim and desire to protect by Letters Patent is:

1. A rake including in combination a ferrule, a plurality of teeth secured to the ferrule, a spacer separate from the ferrule and engaged with the teeth and a resilient member secured to the ferrule and to the spacer.

2. A rake including in combination a ferrule, a plurality of teeth secured to the ferrule, a spacer engaging the teeth and a spring member bent upon itself to form a loop secured to the ferrule and having its end portions extended divergently and secured to the spacer, the spring member being coiled between its point of connection with the ferrule and its points of connection with the spacer.

3. A rake including in combination a ferrule adapted for the reception of a handle provided with circumferential slots, teeth extending through said slots intermediate their ends, and a key engaged in said ferrule and closing said slots.

4. A rake including in combination a ferrule adapted for the reception of a handle provided with circumferential slots, teeth formed from flat strips bent upon themselves and extending intermediate their ends edgewise through said slots and twisted to extend flatwise from a point spaced from their ends, and a spacer engaging said teeth at points in their flatwise extension.

5. A rake including in combination a ferrule provided with circumferential slots, teeth extending through said slots intermediate their ends, a handle engaged in said ferrule, a key engaged in said ferrule and closing said slots, a spacer engaged with said teeth at points in alignment spaced from said ferrule and a spring member bent upon itself to form a loop secured to said ferrule and having its end portions extended divergently and secured to said spacer, said spring member being coiled between its point of connection with said ferrule and its points of connection with said spacer.

6. A rake including in combination, a ferrule, a plurality of flat members engaged with said ferrule in an edgewise position intermediate their ends, said members being twisted to extend flatwise at points in alignment spaced from said ferrule and a spacer secured to said members adjacent their points of twist.

7. A rake including in combination, a ferrule, a plurality of flat members engaged with said ferrule in an edgewise position intermediate their ends, said members being twisted to extend flatwise at points in alignment spaced from said ferrule and forming teeth, a spacer secured to said members adjacent their points of twist and a spring member bent upon itself intermediate its ends, said spring member being secured to said ferrule at its point of bend and having its free ends secured to said spacer.

8. A rake including in combination a ferrule, a plurality of teeth secured to the ferrule, a spacer engaging the teeth and a spring formed from a single member bent upon itself and secured to the ferrule and to the spacer.

9. A rake including in combination a ferrule adapted for the reception of a handle and provided with slots, teeth lying in said slots intermediate their ends and a key engaged in said ferrule and adapted to close said slots.

10. A rake including in combination a ferrule, a plurality of flat members engaged with said ferrule in an edgewise position intermediate their ends, said members being twisted to extend flatwise at points in alignment spaced from said ferrule, a spacer secured to said members adjacent their points of twist and a tension member secured to said ferrule and to said spacer.

11. A rake including in combination a ferrule adapted for the reception of a handle and provided with slots, teeth lying in said slots intermediate their ends, a key engaged in said ferrule and adapted to close said slots, a spacer engaging said teeth at points spaced from their free ends and a tension member secured to said ferrule and to said spacer.

ALFRED J. BAILIE.